United States Patent
Xuan et al.

(10) Patent No.: US 10,456,922 B2
(45) Date of Patent: Oct. 29, 2019

(54) INTERACTIVE MOBILE PLATFORM CONTROL SYSTEM

(71) Applicants: JIANGSU MIDEA CLEANING APPLIANCES CO., LTD., Suzhou (CN); MIDEA GROUP CO., LTD., Foshan (CN)

(72) Inventors: Xiaogang Xuan, Suzhou (CN); Liang Li, Suzhou (CN)

(*) Notice: Subject to any disclaimer, the term of this patent is extended or adjusted under 35 U.S.C. 154(b) by 0 days.

(21) Appl. No.: 16/125,785

(22) Filed: Sep. 10, 2018

(65) Prior Publication Data
US 2019/0143529 A1 May 16, 2019

Related U.S. Application Data

(63) Continuation of application No. PCT/CN2018/098038, filed on Aug. 1, 2018.

(51) Int. Cl.
*B25J 13/00* (2006.01)
*B25J 9/00* (2006.01)
(Continued)

(52) U.S. Cl.
CPC ........... *B25J 13/006* (2013.01); *B25J 9/0003* (2013.01); *B25J 11/0085* (2013.01);
(Continued)

(58) Field of Classification Search
CPC ...... B25J 9/0003; B25J 9/1602; B25J 9/1689; B25J 11/0085; B25J 13/003; B25J 13/006; H04M 1/72533
See application file for complete search history.

(56) References Cited

U.S. PATENT DOCUMENTS

| | | | |
|---|---|---|---|
| 2008/0044006 A1* | 2/2008 | Kitagawa | G08C 17/00 379/433.01 |
| 2015/0112667 A1* | 4/2015 | Kozuka | H04M 1/72533 704/201 |
| 2016/0359325 A1* | 12/2016 | Kawata | G16H 40/67 |

FOREIGN PATENT DOCUMENTS

| CN | 106875523 A | 6/2017 |
|---|---|---|
| CN | 107170097 A | 9/2017 |
| CN | 206574154 U | 10/2017 |

OTHER PUBLICATIONS

Roomote, "Roomote iPhone App", Mar. 24, 2010, https://www.youtube.com/watch?v=Jd-yYoZcXJw (Year: 2010).*
(Continued)

*Primary Examiner* — Spencer D Patton
(74) *Attorney, Agent, or Firm* — Kilpatrick Townsend & Stockton, LLP

(57) ABSTRACT

An interactive mobile platform control system includes a mobile terminal; a robot intelligent platform wirelessly communicated with the mobile terminal; and a household robot wirelessly communicated with the robot intelligent platform, the mobile terminal is installed with a lightweight software corresponding to the household robot, and configured to receive a user instruction through the lightweight software, the lightweight software is configured to convert the user instruction into a control command and transmit the control command to the robot intelligent platform; the robot intelligent platform is configured to transcode the control command to output an executable command to the household robot; and the household robot is configured to receive the executable command and complete a corresponding action according to the executable command. This system realizes the remote control of the household robot by virtue of the robot intelligent platform, without additional installation of APP on the mobile terminal.

6 Claims, 1 Drawing Sheet

(51) Int. Cl.
*H04W 4/20* (2018.01)
*H04W 4/80* (2018.01)
*B25J 11/00* (2006.01)
*H04M 1/725* (2006.01)
*H04L 29/08* (2006.01)
*H04L 12/28* (2006.01)

(52) U.S. Cl.
CPC .......... *H04L 12/2803* (2013.01); *H04L 67/12* (2013.01); *H04L 67/306* (2013.01); *H04M 1/72533* (2013.01); *H04W 4/20* (2013.01); *H04W 4/80* (2018.02); *H04M 1/7253* (2013.01)

(56) References Cited

OTHER PUBLICATIONS

International Search Report for PCTCN2018098038 dated Jul. 11, 2018, 9 pages.

\* cited by examiner

INTERACTIVE MOBILE PLATFORM CONTROL SYSTEM

CROSS-REFERENCE TO RELATED APPLICATION

This application is a continuation of International Application No. PCT/CN2018/098038, filed on Aug. 1, 2018, which claims priority to and benefits of Chinese Patent Application Serial No. 201721499388.X, filed with the State Intellectual Property Office of P. R. China on Nov. 10, 2017, the entire content of which is incorporated herein by reference.

FIELD

The present disclosure relates to the field of smart home technology, and more particularly to an interactive mobile platform control system.

BACKGROUND

With the arrival of intelligent age, intelligence of household robots is continuously improved, and more and more intelligent products have entered family life. Since the birth of the household robot, its control mode has experienced three stages, initially from a contact control via a button, then to a short-range control via an infrared remote control, now to a remote control via an APP (Application) of a mobile terminal (e.g. a mobile phone, a tablet computer).

At present, for the household robot with a WIFI (wireless fidelity) connection function, a user needs to download and install an APP corresponding to the household robot to the mobile terminal first, and then configure the household robot through the APP to connect to the network, so as to establish a communication mechanism between the mobile terminal and the household robot, and further to achieve a remote control of the household robot. However, the control mode at the current stage has the following shortcomings:

(1) The APP has to be installed so that user behavior is bound;
(2) The memory of the mobile phone is occupied, resulting in tight memory;
(3) The interaction mode is single, the user only can achieve simple control via the APP, and cannot get potential value from it.

SUMMARY

Embodiments of the present disclosure seek to solve at least one of the problems existing in the related art to at least some extent.

For this, an object of the present disclosure is to provide an interactive mobile platform control system so as to realize remote control of a household robot by virtue of a robot intelligent platform, without additional installation of an APP on a mobile terminal, thereby saving the memory of the mobile terminal.

To achieve the above object, embodiments of the present disclosure provide an interactive mobile platform control system, including: a mobile terminal, a robot intelligent platform wirelessly communicated with the mobile terminal, and a household robot wirelessly communicated with the robot intelligent platform, in which the mobile terminal is installed with a lightweight software corresponding to the household robot, and configured to receive a user instruction through the lightweight software, the lightweight software is configured to convert the user instruction into a control command and transmit the control command to the robot intelligent platform; the robot intelligent platform is configured to transcode the control command to output an executive command to the household robot; and the household robot is configured to receive the executive command and complete a corresponding action according to the executive command.

The interactive mobile platform control system according to embodiments of the present disclosure includes: the mobile terminal, the robot intelligent platform, and the household robot. The mobile terminal is wirelessly communicated with the robot intelligent platform, and the robot intelligent platform is wirelessly communicated with the household robot. The mobile terminal is installed with the lightweight software corresponding to the household robot, and configured to receive the user instruction through the lightweight software, the lightweight software is configured to convert the user instruction into the control command and transmit the control command to the robot intelligent platform; the robot intelligent platform is configured to transcode the control command to output the executive command to the household robot; and the household robot is configured to receive the executive command and complete the corresponding action according to the executive command. Therefore, the remote control of the household robot is realized by virtue of the robot intelligent platform, without additional installation of APP on a mobile terminal, thereby saving the memory of the mobile terminal.

In addition, the interactive mobile platform control system according to embodiments of the present disclosure also has the following additional technical features:

In some embodiments of the present disclosure, the household robot is further configured to generate state information according to the executive command and feed the state information back to the robot intelligent platform, and the robot intelligent platform is further configured to forward the state information to the lightweight software, through which the state information is provided to a user.

Further, the interactive mobile platform control system as described above further includers a cloud platform wirelessly communicated with both the mobile terminal and the robot intelligent platform, in which the mobile terminal is further configured to transmit the user instruction to the cloud platform through the lightweight software, the cloud platform is configured to decode and deep learn the user instruction to obtain user behavior habit information, and transmit the user behavior habit information to the robot intelligent platform, and the robot intelligent platform is configured to generate an executive command according to the user behavior habit information.

In an embodiment of the present disclosure, the robot intelligent platform includes a memory configured to store the user behavior habit information.

In an embodiment of the present disclosure, the user instruction includes a text instruction or a voice instruction.

In an embodiment of the present disclosure, the mobile terminal includes a mobile phone or a tablet computer.

In an embodiment of the present disclosure, the lightweight software is provided therein with a middleware, through which a programming operation to a movement of the household robot is allowed.

In an embodiment of the present disclosure, the household robot is a cleaning robot.

DETAILED DESCRIPTION

Figure 1:
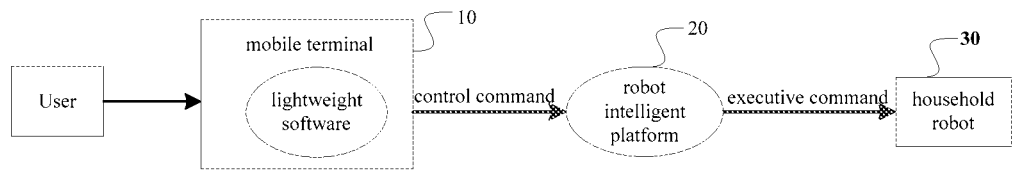
FIG. 1 is a schematic diagram showing an application of an interactive mobile platform control system according to embodiments of the present disclosure.

Embodiments will be described in detail below, examples of which are shown in the accompanying drawings, in which the same or similar elements and elements having same or similar functions are denoted by like reference numerals throughout the descriptions. The embodiments described herein with reference to the accompanying drawings are explanatory, illustrative, and used to generally understand the present disclosure. The embodiments shall not be construed to limit the present disclosure.

In the following, the interactive mobile platform control system according to embodiments of the present disclosure will be described in detail with reference to the accompanying drawings.

FIG. 1 is a schematic diagram showing an application of an interactive mobile platform control system according to embodiments of the present disclosure. As shown in FIG. 1, the interactive mobile platform control system according to the present disclosure includes a mobile terminal 10, a robot intelligent platform 20 and a household robot 30.

The mobile terminal 10 may be configured to wirelessly communicate with the robot intelligent platform 20. The robot intelligent platform 20 may be configured to wirelessly communicate with the household robot 30. In some embodiments, the mobile terminal 10 can be installed with a lightweight software corresponding to the household robot 30, and configured to receive a user instruction input through the lightweight software. The lightweight software can be configured to convert the user instruction into a control command and transmit the control command to the robot intelligent platform 20. The robot intelligent platform 20 can be configured to transcode the control command to output an executive command to the household robot 30. The household robot 30 is configured to receive the executive command and complete a corresponding action according to the executive command.

The lightweight software can include an "applet". For example, the current popular instant chat software (such as WeChat) and third-party payment platforms (such as Alipay) all provide a developer with an interface for developing lightweight software. A user only needs to add a corresponding product software to the platform, without additionally installing various APP software, thereby avoiding the additional installation of various APP software, and saving the memory of the mobile terminal. However, this is not necessarily the only case. The lightweight software can include APP in some other examples.

In some embodiments, when using the household robot 30 (such as a cleaning robot) for the first time, the user needs to first establish a correspondence between the mobile terminal 10 and the household robot 30, i.e., perform a pairing operation. For example, the user opens cellular network or WIFI function of the mobile terminal 10, and opens the WIFI function of the household robot 30 at the same time, so that both the mobile terminal 10 and the household robot 30 are connected to the Internet. After the household robot 30 is connected to the Internet, a unique identification code (such as a SN code or name) of the household robot 30 will be displayed in the lightweight software of the mobile terminal 10 of the user, then the user selects and confirms the household robot 30 to be controlled. After the user completes the selection, pairing of the mobile terminal 10 with the household robot 30 is completed, then the lightweight software of the mobile terminal 10 will record the unique identification code of the household robot 30. At the same time, the mobile terminal 10 may transmit its unique identification code and the unique identification code of the household robot 30 to the robot intelligent platform 20 simultaneously, and the robot intelligent platform 20 will store the identification codes of the mobile terminal 10 and the household robot 30 and the correspondence therebetween. All control instructions will be transmitted to this household robot 30 by default if the mobile terminal 10 does not retransmit other household robot 30 matching therewith to the robot intelligent platform 20. Alternatively, the mobile terminal 10 does not need to additionally transmit its unique identification code and the unique identification code of the household robot 30 to the robot intelligent platform 20, but to transmit the unique identification code of the controlled household robot 30 in each control instruction transmitted subsequently.

When the mobile terminal 10 is successfully paired with the household robot 30, a reminder information of successful pairing will be displayed in the lightweight software of the mobile terminal 10, then the user can control the household robot 30 via the lightweight software of the mobile terminal 10 according to actual needs. For example, the user may select an icon of "start cleaning" on the lightweight software to allow the household robot 30 to clean the entire room, or the user may further select an icon of "room" to select a room to be cleaned, and so on. After completing the selection, the user can make a confirmation by an icon of "confirm", then, the lightweight software will convert the user instruction to a control command and transmit the control command to the robot intelligent platform 20. After receiving the control command, the robot intelligent platform 20 will determine how to control the household robot 30 according to the unique identification code of the mobile terminal 10, and then convert the control command into an executable command and transmit the executable command to the household robot 30. The household robot 30 starts to execute a corresponding action, such as cleaning a certain room, according to the executive command received.

It should be understood that the robot intelligent platform can manage and/or control multiples of household robot 30 in this way. For example, the mobile terminal 10 may be configured to pair with multiples of house robot 30 and transmit SN of each paired household robot 30 to the robot intelligent platform 20. As another example, multiple mobile terminals 10 can pair with multiple household robots 30 and transmit the SN of paired household robots 30 for management. In implementations, the intelligent platform 20 may be configured to store a table recording association between individual mobile terminals 10 and corresponding household robots 30 that have been indicated as being paired with the individual mobile terminals.

When the user wants to control the household robot 30 to stop working, the user may select an icon of "stop" in the lightweight software. After the user completes the selection and makes a confirmation through the icon of "confirm", the lightweight software will convert the user instruction into a control command, and transmit the control command to the robot intelligent platform 20. After receiving the control command, the robot intelligent platform 20 will convert the control command into an executive command and transmit the executive command to the corresponding household robot 30. Then, the household robot 30 will stop working. To this point, a using process of the household robot 30 is completed through the lightweight software in the mobile terminal.

When the user uses the household robot 30 again, the lightweight software in the mobile terminal 10 may be automatically and directly paired with the household robot 30 used in last time. If the pairing is successful, this household robot 30 will be controlled by default before the user changes the household robot 30 to be controlled (possibly there are several household robots 30). If the pairing is unsuccessful, the user will be reminded by the lightweight software to confirm whether the WIFI function of the household robot 30 is turned on, etc.

Therefore, using the lightweight software instead of additionally installing APP on the mobile terminal, the remote control of the household robot is achieved, not only avoiding additional installation of the APP on the mobile terminal, but saving the memory of the mobile terminal.

Figure 2:
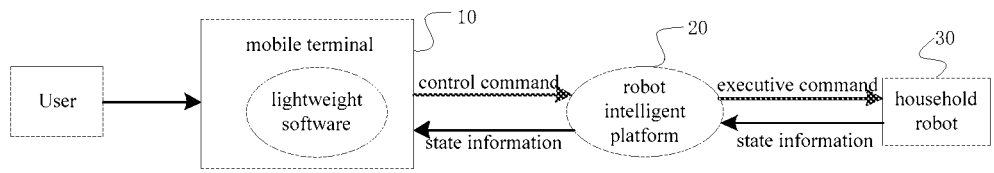
FIG. 2 is a schematic diagram showing an application of an interactive mobile platform control system according to an embodiment of the present disclosure.

Further, according to the present disclosure, as shown in FIG. 2, the household robot 30 is further configured to generate state information according to the executable command and feed the state information back to the robot intelligent platform 20, and the robot intelligent platform is further configured to forward the state information to the lightweight software, through which the state information is provided to a user.

That is, when executing the corresponding action according to the executive command received, the household robot 30 may also reversely feed its own state information back to the lightweight software of the mobile terminal 10, by which the state information of the household robot 30 is provided to the user, so that the user can real-timely check the working state of the household robot, and further control the household robot according to the working state.

For example, when starting to clean a room according to the executable command received, the household robot 30 will transmit the state information that the cleaning has been started to the robot intelligent platform 20, through which the state information will be fed back to the lightweight software of the mobile terminal 10, and through the lightweight software, the user will be informed that the household robot 30 has started cleaning. During the cleaning process, the household robot 30 will feed new state information back to the lightweight software of the mobile terminal 10 at a regular interval (e.g. 2 min). At the same time, the household robot 30 may also feed its position information, power information and so on back to the lightweight software of the mobile terminal 10. When the household robot 30 completes the cleaning, the household robot 30 will feed state information that the cleaning has been finished back to the lightweight software of the mobile terminal 10. The user can remotely monitor the household robot 30 through information displayed on the lightweight software of the mobile terminal 10.

Figure 3:
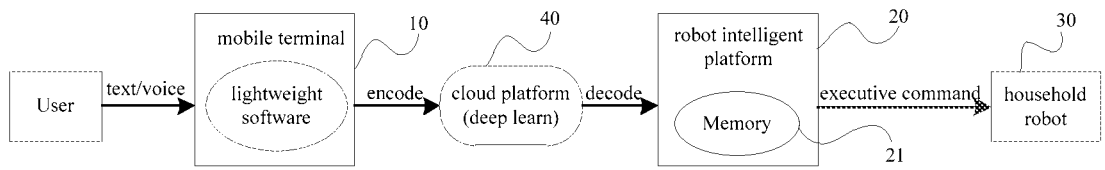
FIG. 3 is a schematic diagram showing an application of an interactive mobile platform control system according to another embodiment of the present disclosure.

According to the present disclosure, as shown in FIG. 3, the interactive mobile platform control system as described above may further include a cloud platform 40. The cloud platform 40 may be configured to wirelessly communicate with both the mobile terminal 10 and the robot intelligent platform 20. Furthermore, the mobile terminal 10 is further configured to transmit the user instruction to the cloud platform 40 through the lightweight software, the cloud platform 40 is configured to decode and deep learn the user instruction to obtain user behavior habit information, and transmit the user behavior habit information to the robot intelligent platform 20, and the robot intelligent platform 20 is configured to generate an executable command according to the user behavior habit information.

Further, as shown in FIG. 3, the robot intelligent platform 20 may include a memory 21 configured to store the user behavior habit information.

In some embodiments, the user instruction may be input in a variety of modes, such as the icon mode as described in above examples, or a text input mode or a voice input mode commonly used at present, i.e., controlling the household robot through a text/voice chat mode. For the icon mode, as the user instruction corresponding to each icon is determined, the control command for the household robot 30 can be obtained simply through table lookup according to the instruction corresponding to the icon, and thus the conversion between instructions can be realized by lightweight software. For the text input mode or the voice input mode, text information/voice information input by the user needs to be analyzed. Since text analysis and voice analysis are complex, in order to improve the accuracy of the analysis, when the user inputs the text information/voice information through a text input module/voice input module of the lightweight software, the text information/voice information input by the user will be analyzed by the cloud platform 40.

For example, when the user inputs the voice information, such as "let the robot clean up the kitchen" through the voice input module of the lightweight software, the lightweight software will transmit the voice information to the cloud platform 40 which has a deep learning framework and a semantic analysis function. The cloud platform 40 will decode and analyze the voice information to extract keywords "kitchen" and "clean up" therefrom, convert these keywords into user behavior habit information "clean up kitchen", and transmit the user behavior habit information to the robot intelligent platform 20. Then, the robot intelligent platform 20 will match the user behavior habit information "clean up kitchen" with a prestored control command "clean kitchen", if the matching is successful, a corresponding executive command will be generated and transmitted to the household robot 30. The household robot 30 executes a corresponding action according to the executive command.

The robot intelligent platform 20 will store the user behavior habit information "clean up kitchen" after receiving it, so that the robot intelligent platform 20 can directly determine that the kitchen needs to be cleaned when receiving it next time, which enables the robot intelligent platform 20 to response quickly, thereby making the household robot 30 response quickly. That is, behavior habits or hobbies of the user can be obtained through deep learning of the cloud platform 40, and stored by the robot intelligent platform 20, so that the robot intelligent platform 20 will respond more quickly after receiving a similar command. For example, according to the behavior habits of the user, the robot intelligent platform 20 will store commands like "clean kitchen", "clean up kitchen", "sweep kitchen" and so on, all of which refers to clean the kitchen, and the robot intelligent platform 20 will make a respond more quickly as long as receiving a similar command to these behavior habits, so as to provide the user with more better services.

Therefore, in the process of controlling the household robot in the text/voice chat mode, the analysis to the text information/voice information input by the user can be achieved by the cloud platform so as to control the household robot remotely. Meanwhile, useful information of the user can be extracted from the information through the deep learning of the cloud platform, so as to actively understand the behavior habits or hobbies of the user, and the behavior habits or hobbies of the user will be stored in the robot intelligent platform, so that the robot intelligent platform can make a response action faster, improving user experiences. Furthermore, as the behavior habits or hobbies of the user are stored in the robot intelligent platform, the user does not need to worry about his/her personal privacy.

In one embodiment, the lightweight software is provided therein with a middleware, through which a programming operation to a movement of the household robot 30 is allowed.

The middleware is such a software that provides a connection between a system software and an application software, so as to facilitate the communication therebetween. In some embodiments, developers may develop in the lightweight software a set of easy-to-learn and easy-to-use middleware, through which the user can make a simple programming for the movement of the household robot 30, which will bring the fun of learning to the user while improving the interactive entertainment, thereby improving the user experience. For example, the middleware may be a visual interface, which includes a number of freely combinable functional modules (e.g., a path module or a region module, etc.), and the user can realize the remote control of the household robot 30 through a logical combination of several functional modules, which enables the user not only to learn knowledge from practice, but also to experience the fun of programming.

In summary, the interactive mobile platform control system according to embodiments of the present disclosure includes: the mobile terminal, the robot intelligent platform, and the household robot. The mobile terminal is wirelessly communicated with the robot intelligent platform, and the robot intelligent platform is wirelessly communicated with the household robot. The mobile terminal is installed with the lightweight software corresponding to the household robot, and configured to receive the user instruction through the lightweight software, the lightweight software is configured to convert the user instruction into the control command and transmit the control command to the robot intelligent platform; the robot intelligent platform is configured to transcode the control command to output the executive command to the household robot; and the household robot is configured to receive the executive command and complete the corresponding action according to the executive command. The interactive mobile platform control system realizes the remote control of the household robot by virtue of the robot intelligent platform, without additional installation of an APP on the mobile terminal, thereby saving the memory of the mobile terminal.

In various embodiments, the mobile terminal 10, the household robot 20 and/or the robot intelligent platform 30 described herein can each comprise a processor configured to execute instructions. In some embodiments, such a processor may be configured to execute logic or program code or for providing application-specific functionality described here as being attributed to the user terminal 10, the household robot 20 and/or the robot intelligent platform 30. Some examples of the processor can include one or more microprocessors (e.g., single core and multi-core) or micro-controllers, one or more field-gate programmable arrays (FPGAs), and application-specific integrated circuits (ASICs). As used herein, a processor includes a multi-core processor on a same integrated chip, or multiple processing units on a single circuit board or networked.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial" and "circumferential" should be construed to refer to the orientation as then described or as shown in the drawings under discussion. These relative terms are for convenience of description and do not require that the present invention be constructed or operated in a particular orientation, and thus shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the phrase of "a plurality of" means two or more than two, for example, two or three, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been shown and described above, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A robot intelligent platform, comprising a processor configured to cause the robot intelligent platform to:
   establish a first wireless link with a mobile terminal, wherein the mobile terminal is configured with a lightweight software, the lightweight software being provided within a client app installed on the mobile terminal, and the mobile terminal is configured to receive a user instruction via the lightweight software, the lightweight software being configured to convert the user instruction into a control command;
   establish a second wireless link with a household robot configured to automatically clean a room of a household;
   receive, via the first wireless link, the control command from the mobile terminal;
   transcode the control command to output an executable command for execution by the household robot to automatically clean the room; and
   transmit, via the second wireless link, the executable command to the household robot;
   wherein the processor is further configured to cause the robot intelligent platform to:
   communicate, over a third wireless link, with a cloud platform;
   receive, from the cloud platform, over the third wireless link, user behavior habit information; and
   generate the executable command according to the user behavior habit information; and, wherein
   the user habit behavior information is generated by the cloud platform via the user instruction transmitted from the mobile terminal to the cloud platform, wherein the generation of the user habit behavior information by the cloud platform comprises: deep learning the user instruction to obtain the user behavior habit information.

2. The robot intelligent platform of claim 1 further comprising a memory configured to store the user behavior habit information.

3. The robot intelligent platform of claim 1, wherein the household robot is a cleaning robot.

4. The robot intelligent platform according to claim 1, wherein generating the executable command according to the user behavior habit information further comprises: upon determining that the user behavior habit information matches with a prestored control command, generating the executable command according to the prestored control command.

5. An interactive mobile platform control system, comprising:
   a mobile terminal;
   a robot intelligent platform wirelessly, over a first wireless link, communicating with the mobile terminal;
   a household robot wirelessly, over a second wireless link, communicating with the robot intelligent platform, the household robot configured to automatically clean a room of a household; wherein
   the mobile terminal is configured with a lightweight software, the lightweight software being provided within a client app installed on the mobile terminal, and the mobile terminal is configured to receive a user instruction via the lightweight software, the lightweight software being configured to convert the user instruction into a control command;
   the robot intelligent platform is configured to:
   receive, via the first wireless link, the control command from the mobile terminal;
   transcode the control command to output an executable command for execution by the household robot to automatically clean the room; and
   transmit, via the second wireless link, the executable command to the household robot;
   and
   a cloud platform wirelessly, over a third wireless link, communicating with both the mobile terminal and the robot intelligent platform, wherein the mobile terminal is further configured to transmit the user instruction to the cloud platform through the lightweight software, the cloud platform is configured to decode and deep learn the user instruction to obtain user behavior habit information, and transmit the user behavior habit information to the robot intelligent platform, and the robot intelligent platform is configured to generate the executable command according to the user behavior habit information.

6. The interactive mobile platform control system according to claim 5, wherein the robot intelligent platform comprises a memory configured to store the user behavior habit information.

* * * * *